United States Patent [19]

Throne et al.

[11] Patent Number: 5,356,282
[45] Date of Patent: Oct. 18, 1994

[54] BLOW MOLDING EXTRUSTION HEAD

[75] Inventors: James L. Throne, Hinckley; Christopher I. Beal, Avon Lake; Michael M. Balasko, Parma, all of Ohio

[73] Assignee: The Geon Company, Independence, Ohio

[21] Appl. No.: 822,813

[22] Filed: Jan. 21, 1992

[51] Int. Cl.$^5$ .................. B29C 47/22; B29C 49/04
[52] U.S. Cl. .................. 425/381; 425/466; 425/467; 425/532
[58] Field of Search ........... 425/532, 467, 380, 381, 425/133.1, 522, 466, 461, 131.1

[56] References Cited

U.S. PATENT DOCUMENTS

| 3,345,690 | 10/1967 | Hagen | 425/145 |
|---|---|---|---|
| 3,386,132 | 6/1968 | Fischer | 425/381 |
| 3,801,254 | 4/1974 | Godtner | 425/380 |
| 3,909,183 | 9/1975 | Hsu | 425/466 |
| 3,985,490 | 10/1976 | Kader | 425/381 |
| 4,038,017 | 7/1977 | Langecker | 425/466 |
| 4,063,865 | 12/1977 | Becker | 425/467 |
| 4,120,633 | 10/1978 | Feuerherm | 425/462 |
| 4,149,839 | 4/1979 | Iwawaki et al. | 425/133.1 |
| 4,422,838 | 12/1983 | Iwawaki et al. | 264/540 X |
| 4,563,147 | 1/1986 | Langecker | 425/532 X |
| 4,565,515 | 1/1986 | Maier | 425/381 |
| 4,798,526 | 1/1989 | Briggs et al. | 425/113 |
| 4,802,833 | 2/1989 | Shapler | 425/532 X |
| 4,890,994 | 1/1990 | Shapler et al. | 425/467 X |
| 4,895,744 | 1/1990 | Briggs et al. | 264/515 X |
| 5,116,215 | 5/1992 | Hsu | 425/532 X |

FOREIGN PATENT DOCUMENTS

| 435786A2 | 7/1991 | European Pat. Off. |
| 56-144929 | 11/1981 | Japan |
| 56-166028 | 12/1981 | Japan |

OTHER PUBLICATIONS

Europlastics, vol. 47, No. 2/3 Mar. 1974, pp. 67–71.

Primary Examiner—Richard L. Chiesa
Attorney, Agent, or Firm—Joseph Januszkiewicz; Joe A. Powell

[57] ABSTRACT

An extrusion head for a blow molding machine wherein a movable plunger is slidably mounted in a distributor head which receives a melt at an inlet end of its channel and directs it along such channel to the terminal end of the channel while simultaneously directing portions of it along spiral radial paths to the lower circumferential edge of the distributor head to fill an accumulator chamber which also causes the plunger to recede facilitating the filling of the accumulator chamber. The channel as defined by the adjacent circumferential wall and the curvilinear contour on the distributor head defines a smooth integral flow channel that is curvilinear in cross section.

9 Claims, 7 Drawing Sheets

FLOW PATHS OF MELT ($R_1$ THROUGH $R_5$)

BLOW MOLDING EXTRUSTION HEAD

BACKGROUND OF THE INVENTION

The present invention relates to an extrusion device for use in blow molding machines and more particularly to a new and improved extrusion head having a plunger and a distributor head for feeding plastic flowable material into an accumulator for blow molding.

Extrusion-blow molding is done as a continuous extrusion process or as an intermittent extrusion process. The continuous extrusion process is best suited for PVC (polyvinyl chloride) and other heat-sensitive resins because the gentle uninterrupted flow reduces the chance for resin thermal degradation. In such continuous molding, the molding process used is either shuttle or rotary to accommodate the continuous flow. The intermittent extrusion process is best used for polyolefin and other non-heat sensitive resins and permits the use of simpler molding mechanisms. The intermittent extrusion machines fall into three categories: reciprocating screw, ram accumulator, and an extrusion accumulator head systems. The reciprocating screw allows accumulation of the melt in front of itself and thence the screw is rapidly pushed forward, forcing the melt through a die head to form a parison. In this instance, the melt remaining in the screw during the forward movement thereof is subjected to heat and can cause problems of degradation if tried with PVC or other heat sensitive thermoplastic materials. The ram accumulator allows the accumulation of the melt in an auxiliary cylinder and is extruded by a special ram. In this case, the disadvantage is that the melt that enters the accumulator first is the last to be extruded. The melt history for this system is not uniform. The accumulator head serves as an extruding die head type having a movable tubular plunger which moves as the accumulator chamber is filled directly from the extruder which has a first in/first out melt flow path. In a typical accumulator head, the melt enters from one side and divides as it flows around the plunger head, reknitting on the opposite side as it fills the accumulator chamber. One problem encountered with this process and the use of the equipment available is weld or knit lines. From a rheologically correct design of melt distribution, it appears and shows a thickness distribution that because of orientation in the flow lines (knit-lines) generated where the divided melt stream comes together, it stretches more here than elsewhere and this leads to thin spots in the blown article. This stretching becomes more apparent when increasing the degree to which the article is increased in size.

Reference is made to U.S. Pat. No. 4,422,838 which discloses an extrusion head with a body portion supporting a movable diverter plunger that is located therein, such that as a melt flows into the body portion through an inlet aperture, the melt flows via a groove into a cavity or flared portion to move around a throttling lower edge. The gap between the cavity and the surrounding wall is essentially uniform as seen in FIG. 4. Herein melt will flow up the groove as the plunger rises, which melt will not be extruded until after an accumulation. In addition, the dimension of the gap of the longitudinal flow channel is essentially constant from the inlet end to the terminal end which results into a non-uniform flow beyond the tapered shoulder or throttling lower edge. Such restrictive throttling lower edge results in excessive shearing of the melt and causes excessive localized heating which would cause thermal degradation.

One solution attempted was to use dual or coaxially spaced melts that are also concentric. However, even in this instance, there is the additional problem of the hot melt remaining in the longitudinal groove where degradation can begin. The object of the present invention is to minimize any residence time in the accumulator, thereby enhancing its ability to process heat-sensitive materials. In addition, a uniform wall thickness in the parison melt is obtained with this new and improved melt feeding system which assures uniform melt distribution around the entire circumference of the parison without the creation of thin spots.

SUMMARY OF THE INVENTION

The present invention relates to an extrusion accumulator head system wherein a movable plunger is reciprocable mounted inside a stationary cylindrically shaped distributor head that has an inlet portion directly in line with a melt supply source and a terminal portion that is 180 degrees opposite such terminal portion. The distributor head cooperates with a surrounding wall to direct the melt along a curvilinear channel in cross section from the inlet portion to the terminal portion as well as along a spiral radial path to the bottom circumferential edge of the distributor head into an accumulator chamber as defined by the bottom portion of the plunger, the surrounding wall, the distributor head and a central core or tube. Such plunger recedes to enlarge the accumulator chamber until sufficient melt is in supply to permit its continuous expulsion by the plunger to form a parison.

DESCRIPTION OF THE PREFERRED EMBODIMENT

Figure 1:
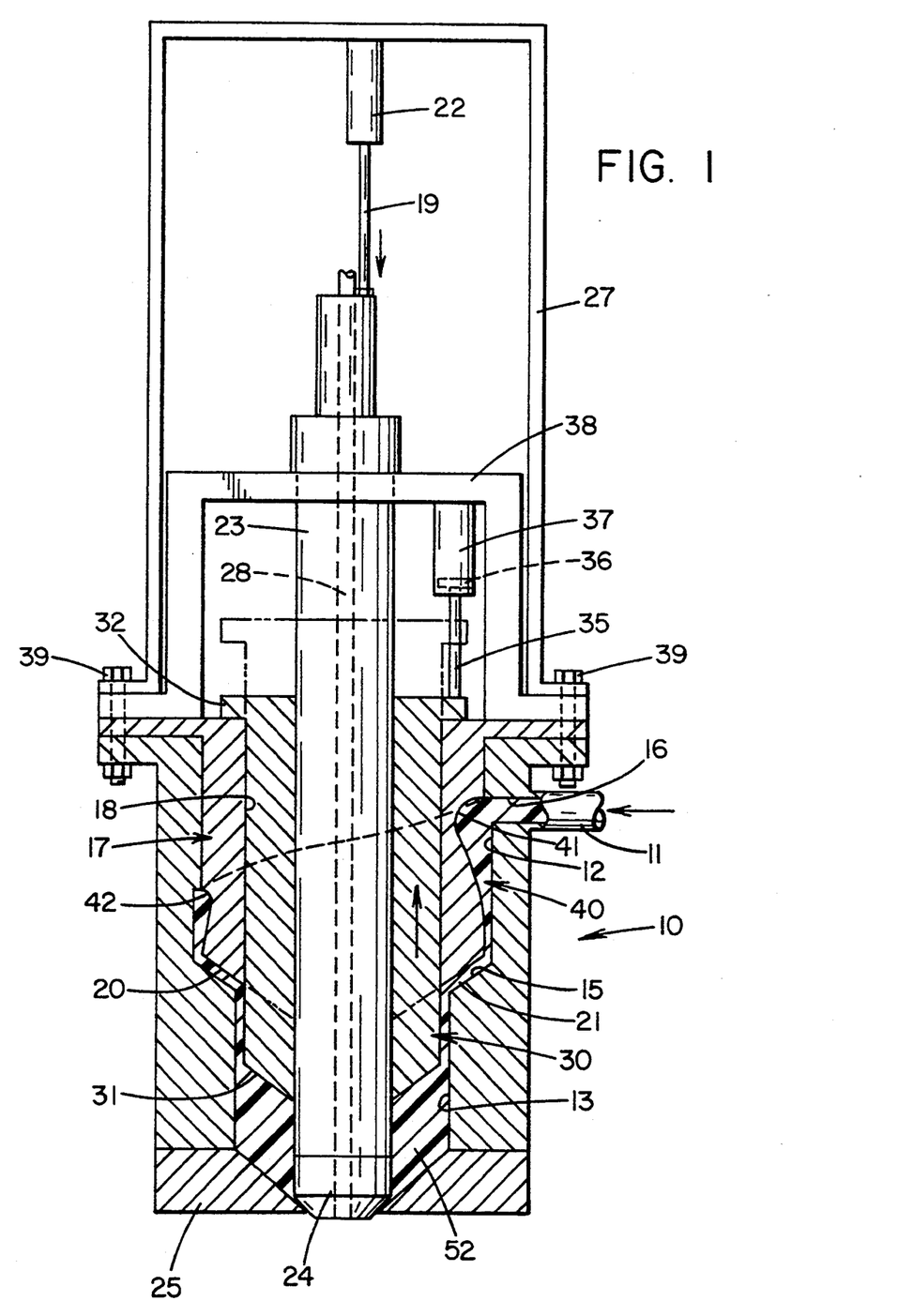
FIG. 1 is a front elevational view, partly in cross section, of an extrusion device for use in blow molding machine in accordance with the present invention.
Figure 2:
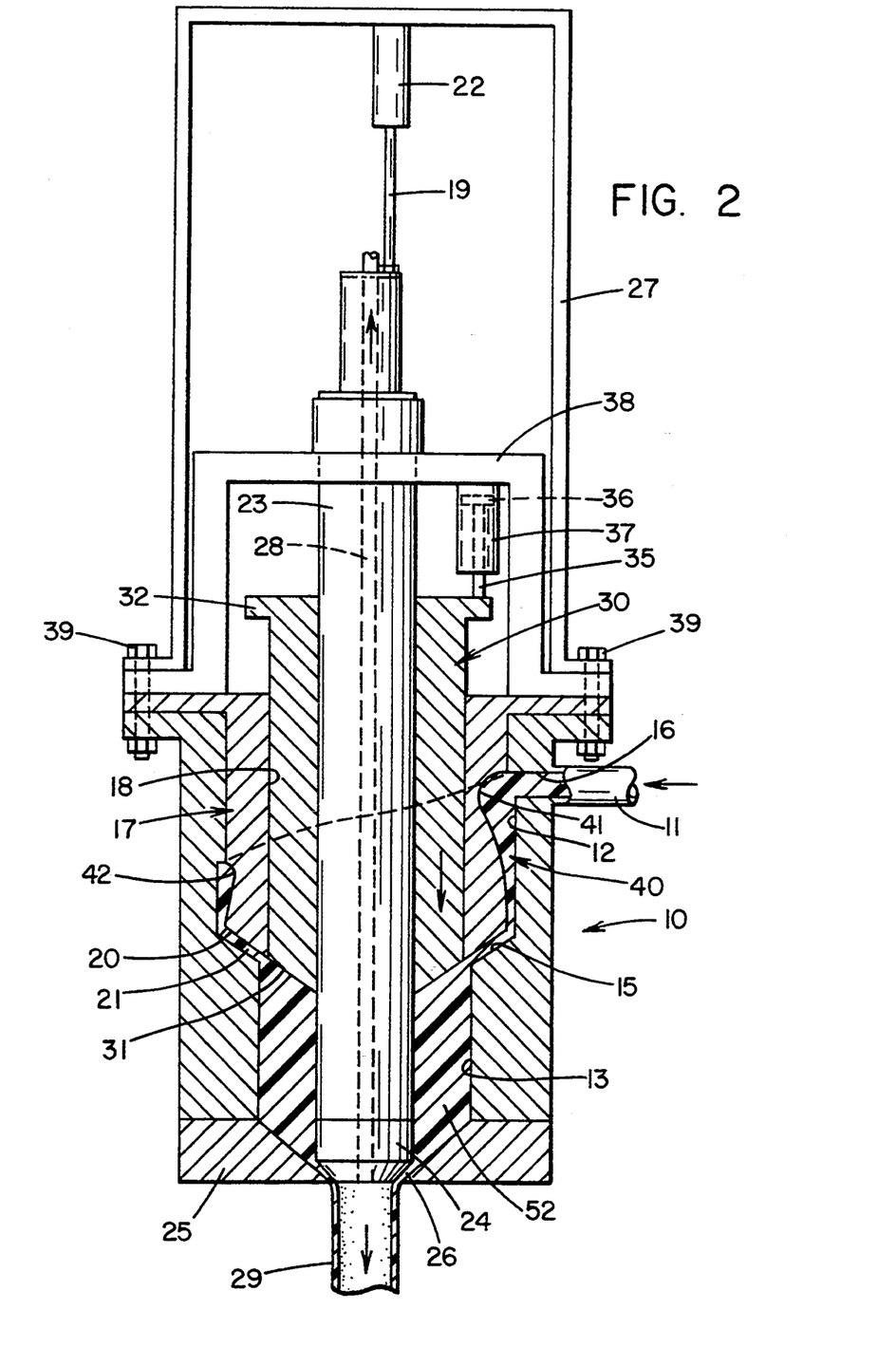
FIG. 2 is a front elevational view of an extrusion device as shown in FIG. 1 but with the plunger head in a retracted condition showing a reservoir of melt in the accumulator head.

Referring now to the drawings, wherein like reference numerals designate like or corresponding parts throughout the several views, there is shown in FIG. 1 for an internal plunger design of an extrusion accumulator head system a cylindrical support or accumulator body 10. Accumulator body 10 of such extrusion head has a central upper bore 12 and a lower bore 13 coaxial therewith which lower bore 13 has a diameter that is smaller than bore 12. An annular tapered shoulder 15 is formed between the juncture of upper bore 12 with lower bore 13. The accumulator body 10 has an inlet bore 16 that communicates a conduit 11 with the upper bore 12. A longitudinally extending distributor head 17 located in upper bore 12 is suitably secured to the accumulator body 10. As viewed in FIG. 1, distributor head 17 has a vertically disposed central bore or opening 18 extending longitudinally therethrough and an annular tapered shoulder 20 at the lower end thereof that cooperates with the tapered shoulder 15 to define a gap or clearance space 21 (FIG. 2) therebetween. Coaxially and concentrically mounted in the longitudinally extending and central bore or opening 18 of distributor head 17 is a core tube 23. The lower end of core tube 23 has a cylindrical mandrel 24 secured thereto that is cooperative with an annular die 25 that is secured to the lower end of cylindrical support or accumulator body 10 to define an annular gap 26 therebetween, as seen in FIG. 2, that facilitates the formation of the parison. The upper portion of core tube 23 is secured to the piston rod 19 of a hydraulic cylinder 22 which is secured to a cross bracket 27 that is suitably secured to the stationary cylindrical support 10. Hydraulic cylinder 22 is used to move the core tube 23 slightly upward from the position shown in FIG. 1 to the position shown in FIG. 2 which creates the gap 26 between the annular die 25 and the lower portion of mandrel 24 to allow for the flow of melt from an accumulator chamber to be described. In the lower position of core tube 23 and mandrel 24 as shown in FIG. 1, mandrel 24 is seated firmly against the tapered inner peripheral surface of annular die 25. As shown in FIGS. 1 and 2, a passageway 28 extends longitudinally through core tube 23 to allow for the controlled passage of pressurized air to help in the formation of a parison 29 (FIG. 2).

Movably journaled within the longitudinally extending central bore or opening 18 of distributor head 17 is a longitudinally extending annular plunger 30 having a lower tapered annular piston surface 31 and an upper flanged end portion 32 projecting out of the distributor head 17 and suitably connected to a rod 35 of a piston head 36 in hydraulic cylinder 37. Hydraulic cylinder 37 is suitably secured to a cross bracket 38 that is suitably secured to the cylindrical support 10 as by bolts 39. A suitable pressurized fluid source is connected to hydraulic cylinder 37 to control the reciprocation or movement of piston rod 35 and plunger 30 in a manner to be described.

Figure 3:
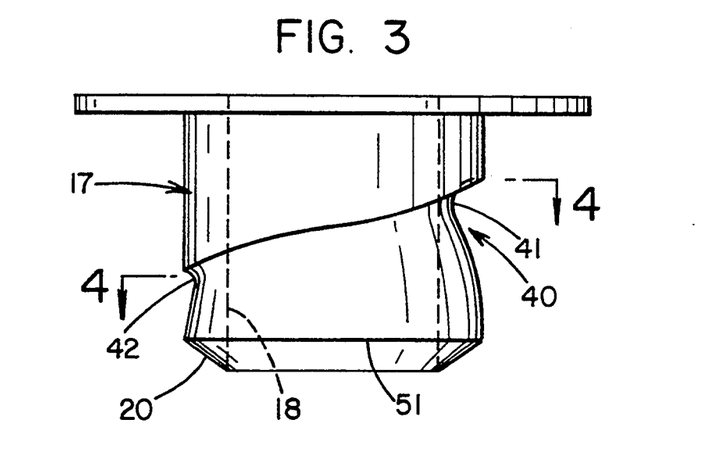
FIG. 3 is a front elevational view of a distributor head shown in FIG. 1.
Figure 4:
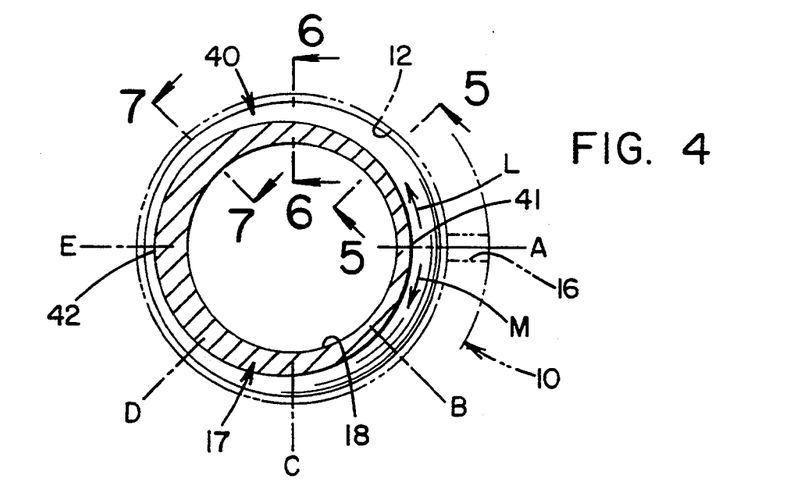
FIG. 4 is a cross-sectional view of the distributor head taken on line 4—4 in FIG. 3.
Figure 5:
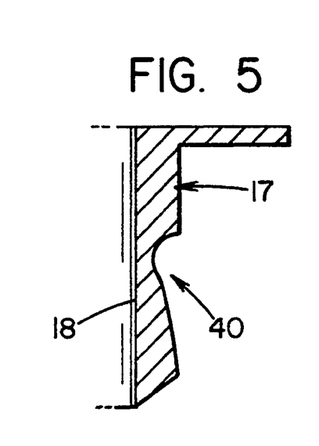
FIG. 5 is a cross-sectional view of the distributor head taken on line 5—5 of FIG. 4.
Figures 6, 7:
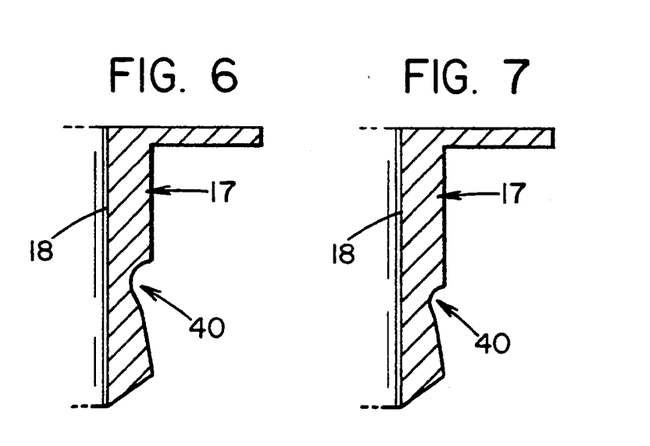
FIG. 6 is a cross-sectional view of the distributor head taken on line 6—6 of FIG. 4.
FIG. 7 is a cross-sectional view of the distributor head taken on line 7—7 of FIG. 4.
Figure 8:
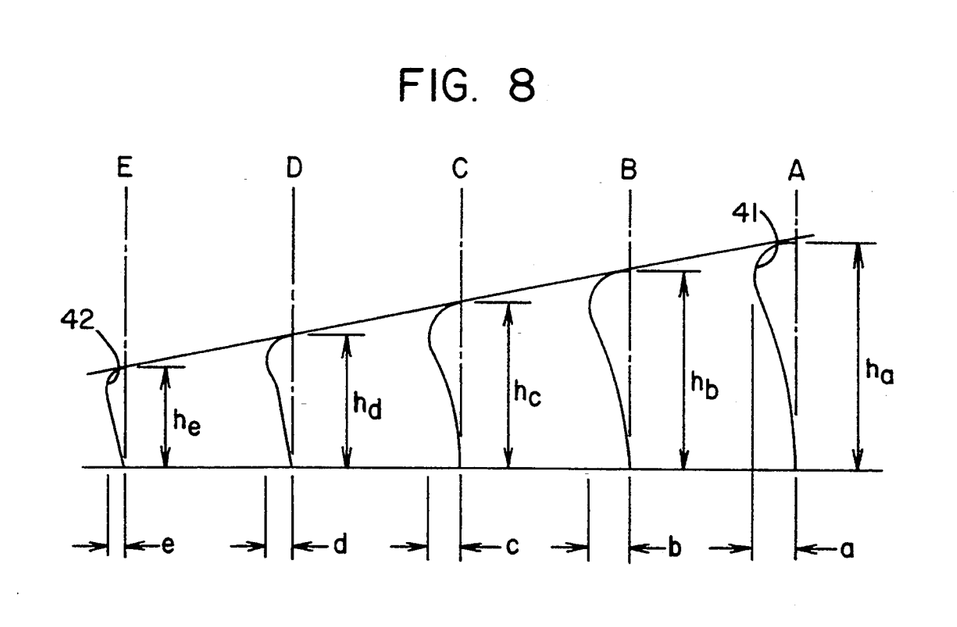
FIG. 8 is a cross-sectional view of a series of profiles of the lower portion of the distributor head taken on lines A through E in FIG. 4 to illustrate the changing profiles of the flow channel presented by such distributor head from the inlet end to the terminal end.

The distributor head 17 in cooperation with the interior wall surface of bore 12 (of cylindrical support 10) defines a flow channel 40 whose inlet portion or inlet end 41, as depicted in FIGS. 1 and 3, is directly across from the inlet bore 16 in accumulator body 10. One hundred and eighty degrees (180°) opposite the inlet portion or inlet end 41 is a terminal end portion 42 depicted in FIG. 3 as taken across line E of FIG. 4. In this context numerals 41 and 42 are on the wall portion of the distributor head 17 and provide a means to locate the elements and contour of the distributor head and channel 40. Additional side elevational cross sections of the distributor head are shown in FIGS. 5, 6 and 7 as taken along lines 5—5, 6—6, and 7—7 in FIG. 4. To further define the contour and configuration of the distributor head 17 is a few additional cross-sections are taken along lines A, B,C, D and E of FIG. 4 and are illustrated in FIG. 8 by the corresponding letters to show the changing contour of the channel 40. The maximum depth of flow channel 40 at inlet portion 41 is designated as "a" and is the deepest portion of such channel. The maximum depth of the flow channel 40 at the portion taken on line B is designated "b", while the maximum depth of the flow channel 40 at the portion taken on line C is "c", with the depth of the flow channel at the portion taken on line D is "d", and portion 42 is "e". In these instances, "a">"b">"c">"d">"e" which stated broadly is that the maximum depth of the flow from the inlet portion 41 to the terminal end portion 42 is a progressive decrease, i.e., the depth decreases from the inlet portion to the terminal end portion. In the above described distributor head, it is to be noted that flow channel 40 divides into two flow paths beginning from the inlet portion 41 to the terminal end 42 as depicted by the two arrows L and M in FIG. 4.

Figure 9:
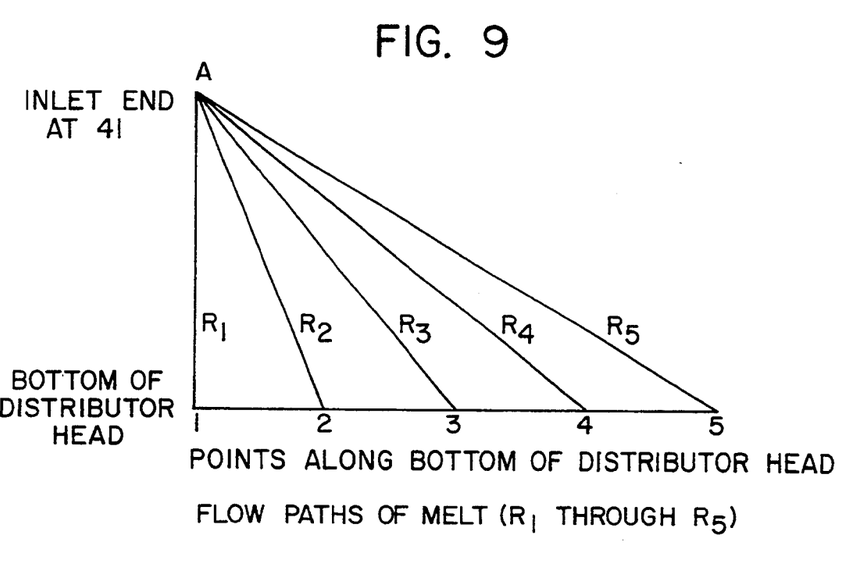
FIG. 9 is a chart illustrating the flowing of melt from the inlet end of the distributor head along a plurality of separate flow paths to the bottom end portion of the distributor head.
Figure 10:
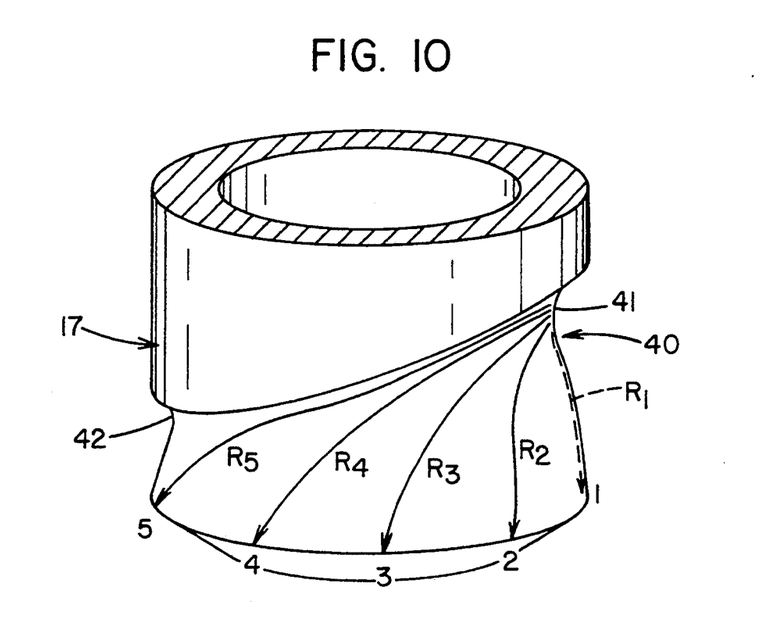
FIG. 10 is a perspective view of the distributor head showing spiral flow paths for the melt.

In addition to decreasing the depth of the flow channel 40 from the inlet portion 41 to the terminal end portion 42, the flow channel 40 also decreases in height from the inlet portion 41 whose height is designated $h_a$ to the terminal end portion 42 whose height is designated $h_e$. In prior art distributor heads, a reference is made to an upper diverter channel or groove and below it is a restrictor zone or lower groove. In this type of construction, the upper groove was in effect a manifold with a large dimension and the lower separate groove is a restrictor zone referred to as a land. Such land portion acts as a major resistance to volumetric flow while the manifold acts to distribute the flow to the land, however, the flow in the groove effects a secondary flow circulation within the groove itself resulting in laminar folding and mixing which increases flow residence time and leads to increased chances of thermal degradation. In addition, the gap of the land must in this design be sufficiently restricted to enable the manifold to perform its function of distributing the melt flow, with the restriction again possibly resulting in shear heating of the polymer which contributes to thermal degradation. The significance of the flow channel 40, in distributor head 17, is that the cross sectional shape of such channel is a curvilinear channel having a continuous flow which integrates the diverter and restrictor zone to a common single channel to provide a flow rate at the circumferential bottom 51 (FIG. 3) of the distributor head 17 that is equal at all points around such bottom line. To depict this, consider the flow channel from the inlet end 41 to the terminal end 42 to be flattened and furthermore consider the flow channel to be symmetric, clockwise and counterclockwise so that only the counterclockwise portion of the flow channel need be considered as depicted by FIG. 9. The gap or clearance space between the very bottom of the distributor head 17 and the adjacent inside wall of the lower bore 13 of the cylindrical support 10 is only uniform whereas the remainder of the gap between the inside wall of the lower bore 13 and the channel 40 is variable to provide uniform flow rates at the ends of each of the spiral radial lines $R_2$, $R_3$, $R_4$, and $R_5$, respectively, as depicted by FIG. 10 where they all began at inlet 41. Line $R_1$ is the shortest distance to travel and is along line from inlet 41 in a vertical plane directly downwardly whereas the remaining flow lines from $R_2$ to $R_5$ are radial spiral lines that extend from inlet 41 to the very bottom of the distributor head 17 as depicted by FIG. 9. The significance of the $R_2$ through $R_5$ is that the radial spiral lines increase in velocity for each line from $R_2$ to $R_5$ so that all portions of the melt arrive at the circumferential bottom line of the distributor head at the same time. Another way of considering the radial spiral flow lines as depicted by $R_1$ through $R_5$ is to consider them as balancing the flow at the lowest bottom edge of the distribution head by changing the depth of the spiral flow paths differentially along each of these lines, such that the differential volumetric flow is the same at each interval along the spiral flow path. To achieve this flow the gap taken (along a circumferential plane that is normal to the central axis of the distributor head) between the inside wall of the upper bore 12 and the outside wall of the distributor head (taken on a line that intersects the outside wall of the distributor head, which line lies in a plane that passes through the central axis and which plane is normal to the circumferential plane) increases in dimension from the inlet portion to the terminal end portion. With these types of increases in dimensions in the gap, the flow paths of the melt material entering the channel 40 at the inlet portion 41 takes on a plurality of flow paths as described above which are along lines $R_1$ through $R_n$, thus arriving at the circumferential bottom portion of the distributor head and pushes the plunger 30 upwardly as viewed in FIG. 1 to provide an accumulation thereof in the accumulator chamber 52 (FIG. 2) defined by the plunger 30, the lower bore 13 and the core tube 23 until such time that the proper amount is accumulated and thence the plunger 30 is moved rapidly downward as viewed in FIG. 2 while simultaneously with this action the flow of the melt into channel 40 continues uninterrupted and a parison 29 is formed from the extrudate as it passes through the die 25 as modified by the mandrel 24. In this operation as described above, as the melt is accumulating in the chamber 52 hydraulic cylinder 37 will be actuated to slowly raise the plunger 30 from the position shown in FIG. 1 to the position shown in FIG. 2 in cooperation with the force exerted by the melt on plunger 30 until the accumulator chamber has sufficient melt to form the desired parison at which time the head end of hydraulic cylinder 37 is actuated to force plunger 30 downwardly as hydraulic cylinder 22 is actuated to raise slightly core tube 23 to create a gap or clearance space between man&el 24 and die 25 to facilitate the formation of the parison.

Figure 11:
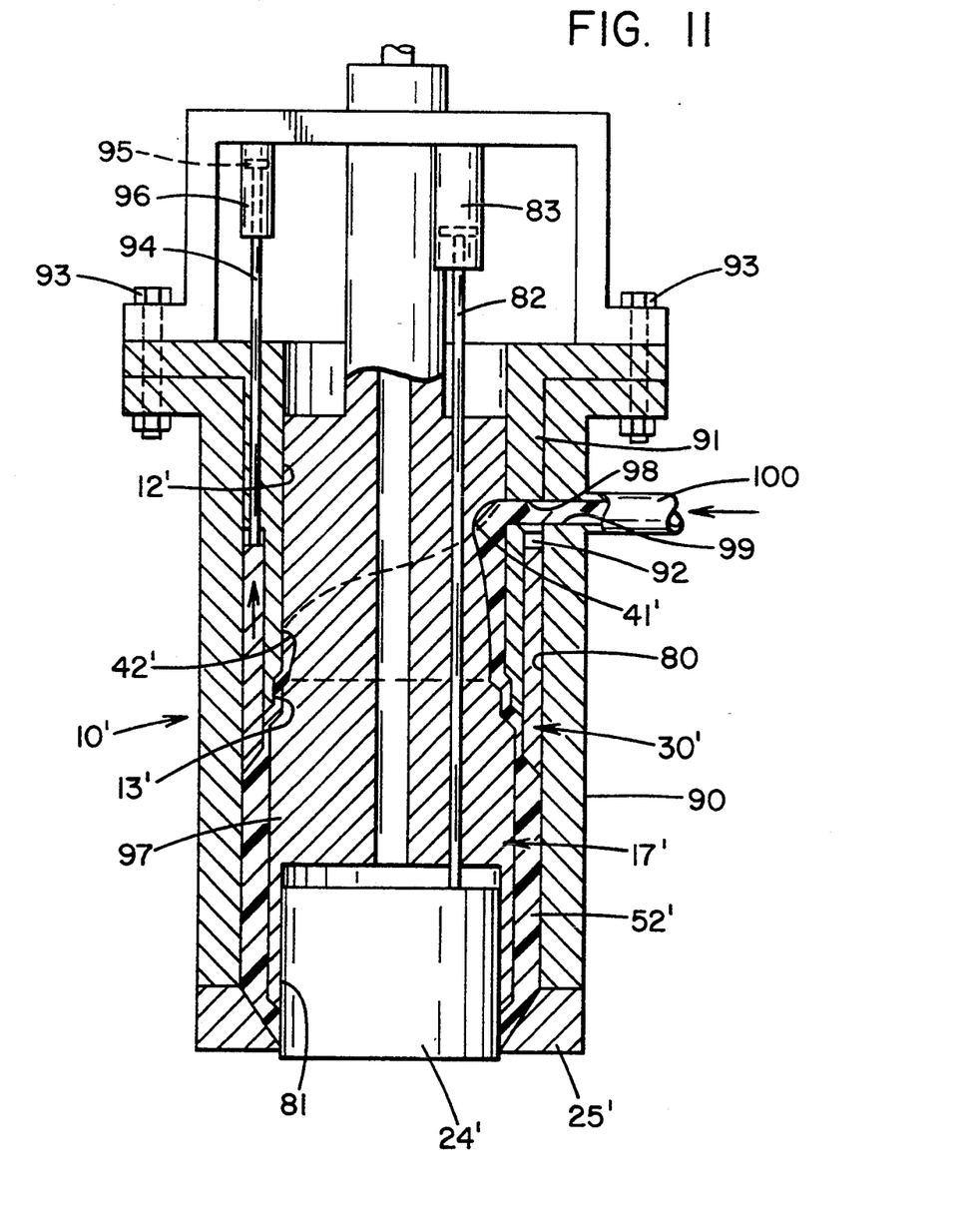
FIG. 11 is a front elevational view, partly in cross-section of a modified extrusion device for use in blow molding similar to FIG. 1.
Figure 12:
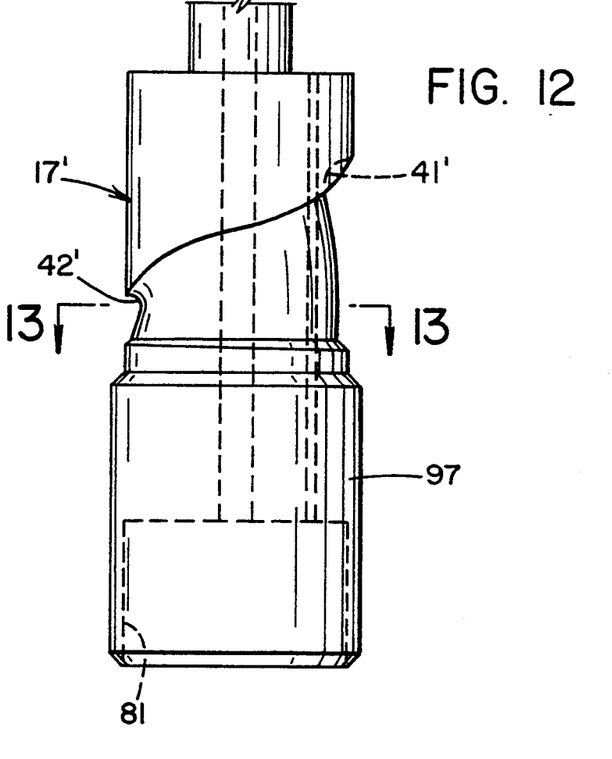
FIG. 12 is a front elevational view of the distributor head shown in FIG. 11; and, FIG. 13 is a cross-sectional view of the distributor head taken on line 13—13 in FIG. 12.
Figure 13:
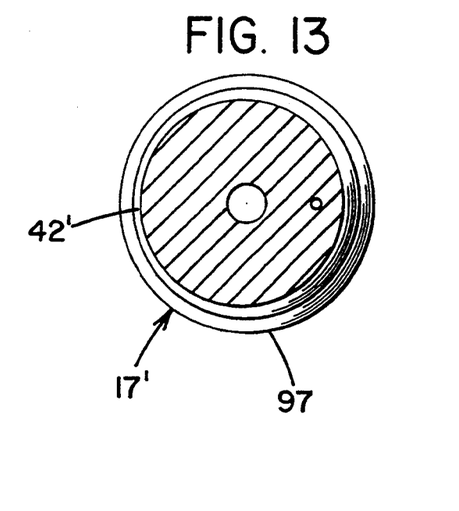

A modification of the invention is shown in FIGS. 11, 12 and 13 wherein a plunger 30' is located circumferentially exteriorly of the distributor head 17', which head 17' is identical in all aspects to that in the first described embodiment except its central longitudinally extending central bore is smaller in diameter since it does not accept a movable plunger. To describe this embodiment, primed numerals are used since the structure and operation of the structure are substantially identical to that of the previously described embodiment.

The plunger 30' is annular in shape and mounted in a central bore 80 of an outer cylindrical support 90. An inner cylindrical support 91 has a circumferentially extending recess on its lower outer periphery for cooperation with the intermediate bore portion 80 of cylindrical support 90 to define a chamber or groove 92 within which annular plunger 30' can reciprocate. The upper portions of outer and inner cylindrical supports 90 and 91 respectively have flange portions to facilitate their interconnect as by bolts 93 to define an integral support, or accumulator body 10'. The inner cylindrical support 91 has a vertically extending bore or bores to receive a rod or rods 94 that has one end secured to the plunger 30' and the other end secured to a piston 95 that is mounted in hydraulic cylinder 96. Pressurization of the rod end of cylinder 96 would raise the plunger 30' vertically whereas pressurization of the head end of cylinder 96 would lower the plunger 30' as viewed in FIG. 11. The inner bore of inner cylindrical support 91 has an upper bore portion 12' and a lower bore portion 13' which are located relative to the distributor head 17' in the same manner as in the first described embodiment, where distributor head 17' is contoured in the same manner as described with respect to distributor head 17 and which are further shown in FIGS. 3, 5 through 8 and FIG. 10. The only differences in these heads is that distributor head 17' has a lower portion 97 that is cylindrical in shape and cooperates with the outer cylindrical support 90 to define an accumulator chamber 52' similar in function to accumulator chamber 52 as described hereinbefore.

A pair of aligned bores 98 and 99 in the inner cylindrical support 91 and the outer cylindrical support 90 respectively registers with an inlet end 41' as depicted in FIG. 11. A suitable conduit 100 is connected to bore 99 to supply hot plasticized melt thereto for processing by the cooperative action of the plunger 30' and the distributor head 17' as described in the first embodiment above. Located within a lower bore 81 in distributor head 17' is a movable mandrel 24' that is connected by a rod 82 to a piston in hydraulic cylinder 83 which selectively raises or lowers the mandrel 24'. An annular die 25' is secured to the lower portion of the outer cylindrical support 90 to either block the flow of melt from chamber 52' or allow its flow when mandrel 24' is raised to form a parison as is old and well-known in the art.

It will be apparent that, although a specific embodiment and a certain modification of the invention has been described in detail, the invention is not limited to the specifically illustrated and described constructions since variations may be made without departing from the principles of the invention.

What is claimed:

1. In an extrusion head for use in a blow molding machine having an extruder for uniformly delivering polymer melt to said extrusion head; said extrusion head having a cylindrical support with a longitudinally extending central bore; said central bore having an outlet bore portion; a die member mounted at said outlet bore portion; said cylindrical support having an inlet bore for receiving melt for processing; a distributor head located in the upper portion of said central bore and fixedly secured to said cylindrical support; said distributor head having a central opening coaxial with said central bore; a plunger journaled in said central opening; said distributor head having a lower peripheral bottom portion; power means connected to said plunger operable to reciprocate said plunger to and from said die member for expressing melt through said die member; said distributor head having a melt flow channel that extends circumferentially around thereof; said channel having an inlet portion that communicates with said inlet bore of said cylindrical support; said channel having a terminal end portion diametrically opposite said inlet bore; said channel has an upper curved portion in cross section; said channel having a lower linear portion; said channel having an intermediate linear portion linking said upper and lower portions to define a curvilinear channel in cross section; said lower linear portion of said channel terminates at said lower peripheral bottom portion of said distributor head; said channel is circumferentially extending and descending from said inlet portion to said terminal end portion to direct melt from said channel to that portion of said central bore at the bottom of said plunger to move said plunger away from said die member to accumulate melt therebetween.

2. In an extrusion head as set forth in claim 1 wherein said plunger is an annular member, and said power means being operative to move said plunger toward said die member to extrude a parison therefrom while allowing the melt to flow from said inlet bore toward said die member.

3. In an extrusion head as set forth in claim 1 wherein a gap is formed between said curvilinear channel and the opposite circumferentially extending wall of said central bore, and said gap being dimensioned to provide a uniform radial spiral flow path for melt entering said at said inlet portion that flows along said distributor head.

4. In an extrusion head as set forth in claim 3 wherein the melt flowing radially remains at a constant velocity or increases in velocity as the length of said radial flow paths increase in distance traveled from said inlet portion of said distributor head to provide a uniform flow distribution along said entire lower peripheral bottom portion of said distributor head.

5. In an extrusion head as set forth in claim 3 wherein said radial flow paths are dimensioned to increase in velocity the melt as said radial flow path increases in distance traveled from said inlet portion of said distributor head to provide a uniform flow distribution of melt along the entire circumferential lowest extremities of said distributor head.

6. In an extrusion head as set forth in claim 5 wherein the uppermost portion of said gap as defined by said flow channel decreases in width from said inlet portion to said terminal end portion, and said width is measured along a line that is normal to the axis of said central bore.

7. In an extrusion head as set forth in claim 1 wherein a gap is formed between said curvilinear channel and the opposite circumferentially extending wall of said central bore, said central bore having a central axis, and said curvilinear channel has a progressive decreasing volume from said inlet portion of said channel to said terminal end of said channel when taken on a plane that contains said central axis.

8. In an extrusion head as set forth in claim 7 wherein said gap dimensioned on a plane that contains said central axis is proportioned to provide a uniform flow distribution at each point along said lower peripheral bottom portion of said distributor head which is the lowest extremities of said distributor head.

9. In an extrusion head for use in a blow molding machine having an extruder for uniformly delivering polymer melt to said extrusion head; said extrusion head having a support means with a central bore; said central bore having an outlet bore portion; a die member mounted at said outlet bore portion; said support means having an inlet bore for receiving melt for processing; a distributor head located in the upper portion of said central bore and fixedly secured to said support means; said distributor head having a central opening coaxial with said central bore; a mandrel journaled in said central opening; power operated means connected to said mandrel for selectively moving said mandrel away from said die member to define a gap therebetween to allow the formation of a parison; an annular plunger mounted in said central bore; said distributor head having a lower peripheral bottom portion; power means connected to said plunger operable to reciprocate said plunger to and from said die member for expressing melt through said gap; said distributor head having a melt flow channel that extends circumferentially around thereof; said channel having an inlet portion that communicates with said inlet bore of said support means; said channel having a terminal end portion diametrically opposite said inlet bore; said channel having an upper curved portion in cross section that merges with a lower linear portion to define a curvilinear channel in cross section; said lower linear portion of said channel terminates at said lower peripheral bottom portion of said distributor head; said channel is circumferentially extending and descending from said inlet portion to said terminal end portion to direct melt from said channel to that portion of said central bore at the bottom of said plunger to move said plunger away from said die member to accumulate melt therebetween; and said curvilinear channel is formed by said distributor head and the inner circumferentially extending wall surface of said central bore to define spiral flow paths for melt entering said inlet portion that flows from said inlet portion towards said terminal end portion and said lower peripheral bottom portion.

* * * * *